United States Patent [19]

Trubiano

[11] Patent Number: 4,773,660
[45] Date of Patent: Sep. 27, 1988

[54] ARRESTING BRACKET FOR A SHOPPING CART

[75] Inventor: Antoine Trubiano, Montreal, Canada

[73] Assignee: Cari-All Inc., Quebec, Canada

[21] Appl. No.: 38,901

[22] Filed: Apr. 16, 1987

[51] Int. Cl.⁴ .............................................. B62D 39/00
[52] U.S. Cl. ............................. 280/33.99 C; 248/214;
248/302
[58] Field of Search ............... 248/551, 552, 553, 121,
248/212, 213.2, 214, 225.31, 231.8, 302, 309.1,
313, 316.1, 316.7, 351, 359 G, 360, 499, 500,
505, 510; 280/33.99 A, 33.99 C

[56] References Cited

U.S. PATENT DOCUMENTS

| | | | |
|---|---|---|---|
| 2,511,451 | 6/1950 | Able | 248/201 |
| 2,678,184 | 5/1954 | Erdody | 248/302 |
| 2,958,500 | 11/1960 | Saunders | 248/351 |
| 3,175,793 | 3/1965 | Kennedy | 248/302 |
| 3,429,541 | 2/1969 | Herman | 248/302 |
| 3,521,842 | 7/1970 | Opperthauser | 248/302 |
| 3,539,204 | 11/1970 | Keller | 280/33.99 A |
| 4,034,539 | 7/1977 | Economy | 280/33.99 A |

FOREIGN PATENT DOCUMENTS

| | | | |
|---|---|---|---|
| 847726 | 7/1970 | Canada | 248/302 |
| 873300 | 7/1949 | Fed. Rep. of Germany | 248/499 |
| 117792 | 2/1926 | Switzerland | 248/231.8 |
| 328374 | 5/1958 | Switzerland | 248/302 |
| 855081 | 11/1960 | United Kingdom | 248/302 |
| 1230757 | 5/1971 | United Kingdom | 248/302 |

*Primary Examiner*—J. Franklin Foss
*Assistant Examiner*—Robert A. Olson
*Attorney, Agent, or Firm*—Oblon, Fisher, Spivak, McClelland & Maier

[57] ABSTRACT

For shopping carts wherein a lock is mounted on the handlebar thereof there is provided an improvement to arrest the lock to prevent it from tilting forward towards the shopping cart. The arresting bracket has a lock arresting portion to prevent the lock from tilting forward toward a rear gate portion of the cart. The bracket also has a bridge portion which extends from the lock arresting portion and terminates in an attachment end which is formed as a loop and is securable about the top horizontal wire of the rear gate. This bracket facilitates pulling a plurality of shopping carts nested together and interlocked by their locks, and further minimizes torsional stress placed on the fasteners holding the handlebar.

6 Claims, 3 Drawing Sheets

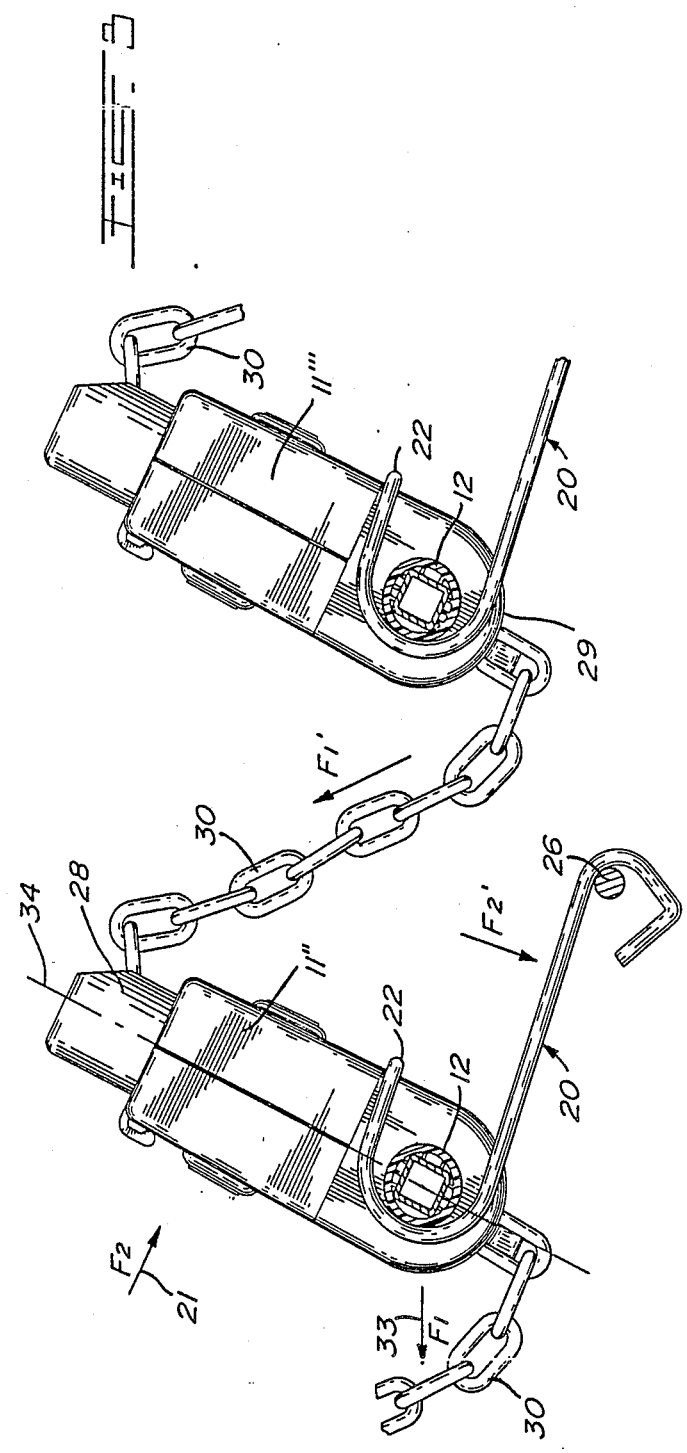

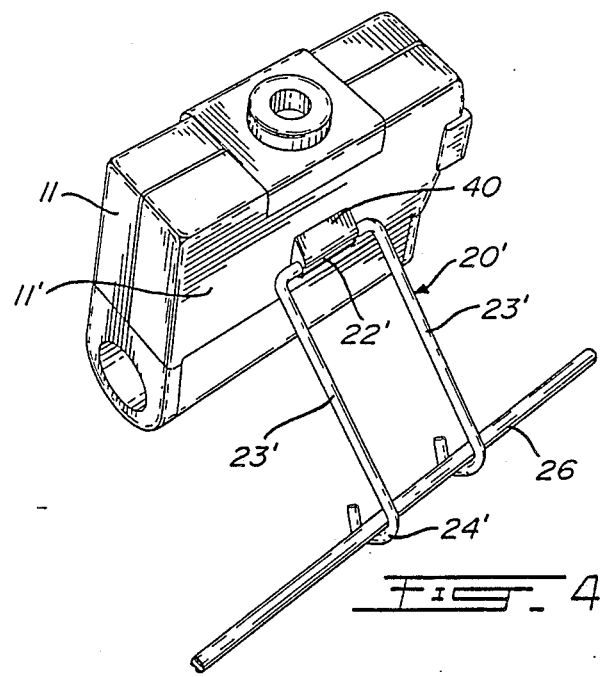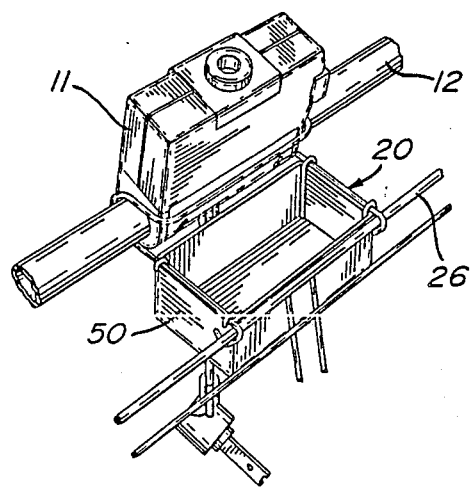

ARRESTING BRACKET FOR A SHOPPING CART

BACKGROUND OF INVENTION

1. Field of the Invention

The present invention relates to an arresting bracket for a shopping cart lock and wherein the lock is mounted on a handlebar of the cart.

2. Description of Prior Art

There exists presently locks for mounting on the handlebar or on the side wall of shopping carts. It has been found that when these carts are nested and interlocked by these locks, often a plurality of these nesting carts are pulled together by a lift truck or other such small vehicle. Accordingly, because of the heavy load placed on the locks, these often break or the part of the shopping cart to which the lock is attached will be damaged.

When the shopping cart lock is mounted on the shopping cart handle the pulling force applied to a series of nested shopping carts is transmitted along the chain links of the locks which connect from the top of one lock to the bottom of an adjacent lock. This applies a torsional load on the shopping cart handle and stresses the handle fasteners which loosen or wear down causing the handlebar to tilt and the lock to move forwardly. When the lock is displaced to a forward position, the shopping carts can no longer be nested properly. Also, these locks when displaced forwardly will also interfere with the baby seating area usually found in the rear portion of a shopping cart. Still further, the locks or their chains will often catch or tangle with other parts of nested carts and make it difficult to detach, thus making a series of nested carts unusable.

SUMMARY OF INVENTION

It is a feature of the present invention to provide an arresting bracket for a shopping cart lock which substantially overcomes all of the above-mentioned disadvantages of the prior art.

According to the above feature, from a broad aspect, the present invention provides an arresting bracket for a shopping cart lock which is mounted on a handlebar of a shopping cart. The arresting bracket has a lock arresting portion to prevent the lock from tilting forwardly on the handlebar toward the rear gate portion of the cart. A bridge portion extends from the lock arresting portion and terminates in an attachment end. The attachment end is securable to the shopping cart forwardly of the handlebar.

BRIEF DESCRIPTION OF DRAWINGS

A preferred embodiment of the present invention will now be described with reference to the examples thereof as illustrated in the accompanying drawings, in which:

FIG. 3 is a schematic illustration showing the position of shopping cart locks when the carts are nested together and the distribution of forces when a plurality of nested carts are pulled in a specific direction;

FIG. 4 is a perspective view showing another example of the construction of the arresting bracket of the present invention; and FIG. 5 is a perspective view showing an auxiliary container secured to the arresting bracket of the present invention.

DESCRIPTION OF PREFERRED EMBODIMENTS

Figure 1:
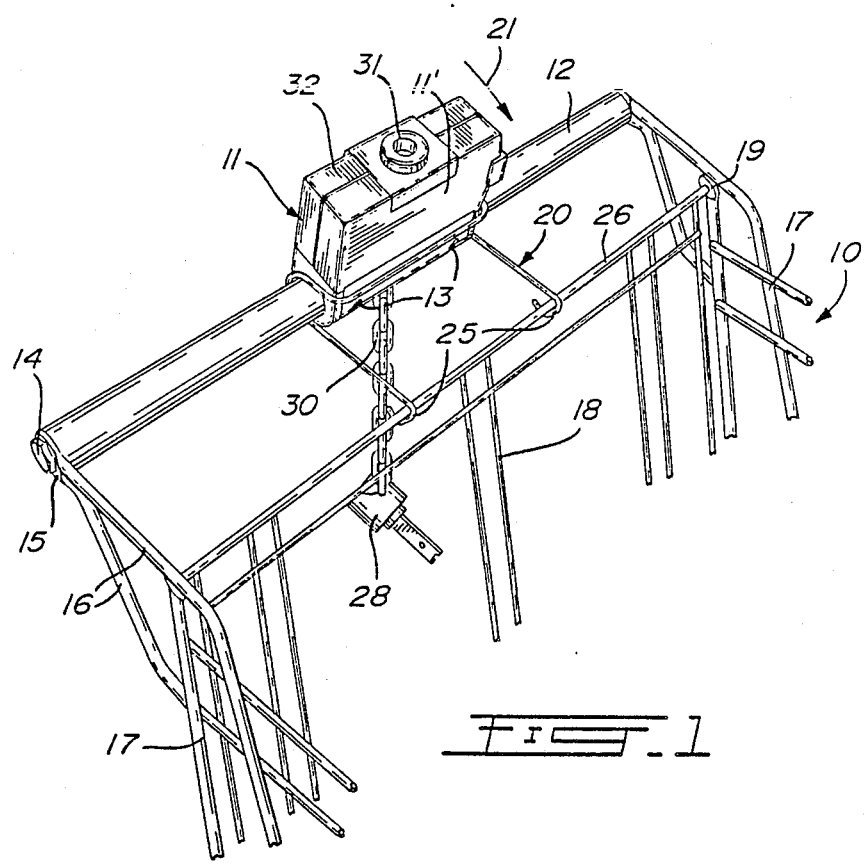
FIG. 1 is a perspective view of an uppermost rear portion of a shopping cart showing a shopping cart lock mounted on a handlebar and arrested from forward movement by the arresting bracket of the present invention.

Referring to the drawings, and more particularly to FIG. 1, there is shown generally at 10 a rear portion of a shopping cart and wherein a lock 11 is secured to the handlebar 12 of the cart by means of fasteners 13. The handle 12 is usually secured by bolts or other type fasteners 14 extending through a loop portion 15 of a handle support bracket 16. The bracket 16 is secured adjacent a rear portion of the side wall 17 of the cart. A tiltable rear gate 18 constitutes the back wall of the cart and lifts up on a hinge attachment 19 when shopping carts are nested within one another.

The present invention relates to an arresting bracket 20 which prevents the lock 11 from tilting forwardly on the handlebar 12 in the direction of arrow 21, and towards the rear gate 18 of the shopping cart when a force is applied to the lock in the direction 21.

Figure 2:
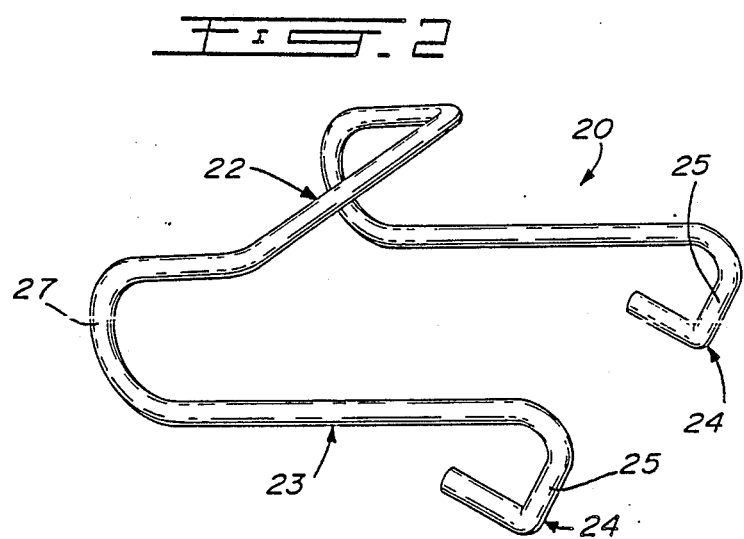
FIG. 2 is a perspective view of a preferred example of the construction of the arresting bracket of the present invention.

Referring now additionally to FIGS. 2 and 3, the arresting bracket 20 is herein shown as formed from a wire rod which is bent in a generally U-shaped configuration and defines essentially a lock arresting portion 22, a bridge portion 23, and an attachment end 24. The attachment end 24 is constituted by forming a loop 25 at the free end portion of the U-shaped rod, and these loops are engaged about the top horizontal wire or wires 26 of the rear gate 18.

The bridge portions 23 are constituted by substantially parallel straight side wire portions which extend into a handlebar receiving channel portion 27 defined by bending the wire into a U-shape. The arresting portion 22 is simply constituted by a straight wire portion which extends transverse to the bridge portion 23 and the channel portion 27. This arresting wire portion 22 is retained in abutment against the rear wall 11' of the lock 11 and prevents the lock from tilting in the direction of arrow 21 when forced in that direction.

The arresting bracket 10 is positioned about the handlebar 12, the lock 11, and the top horizontal wire 26 of the rear gate 18 in the manner as illustrated in FIGS. 1 and 3. With specific reference to FIG. 3, the purpose of the arresting bracket will now be described. As can be seen in FIG. 1 the lock 11 is provided with a key 28 which is secured to a lower end 29 of the lock by a flexible link means, herein a chain 30. This link means could also be constituted by a steel wire or other suitable securing connection.

As shown in FIG. 3, when the carts are nested with one another, the foremost lock 11'' receives in a key slot 31 in the top wall 32 thereof the key element 28 from the adjacent lock 11''' whereby to interlock the nested carts together. These keys are unlocked by inserting a coin in a coin carrier (not shown) and not forming part of this invention. With a plurality of carts 10 nested in this fashion it can be seen that if these nested carts are pulled in the direction of arrow 33, a force F1 is required in order to displace all of the nested carts which are interconnected to one another by the flexible link 30. The force F1, in the direction of arrow 33, which is generated by pulling on the handlebar 12 or on the chain link 30 will generate a force F1' in chain link 30 intermediate the locks 11' and 11'''. This pulling force F1' in turn applies a pressure F2 on the lock in the direction of arrow 21. If the arresting bracket 20 was not present, this force F2 would be transmitted to the handlebar 12 and generate a torque force thereabout which would be transmitted to the fastener 14, and depending on the load of that force could strip the fastener or cause the handlebar to rotate slightly thereby displacing the lock 11'' from its effective axis 34 which ensures proper securement of the link means 30 with the adjacent lock 11'''. By positioning the arresting bracket 20, as herein shown, the downward resulting force F2' is arrested by the straight arresting portion 22 of the bracket and transmitted to the top hinge portion wires 26 of the rear gate and to the frame of the shopping cart 10. Thus, the lock is always retained on its working axis 34 and strain is removed from the handlebar fasteners 14, and accordingly it is possible to displace a plurality of nested carts interlocked with one another without damage to the lock 11 or the handlebar 12.

As previously described, arresting the forward tilt angle of the lock 11 could prevent it from causing other damage to the carts or to the lock, and also ensures that all carts may be removed from a plurality of nested carts.

Referring now to FIG. 4, there is shown another example of the construction of the arresting bracket of the present invention. As herein shown, the bracket 20' is also constituted by a U-shaped wire having straight bridge portions 23' and a straight lock arresting portion 22'. The arresting portion 22' is received in a latch 40 secured to the rear wall 11' of the lock 11.

FIG. 5 shows a further modification of the arresting bracket and, as herein shown, this bracket may be utilized to further support an auxiliary container 50 which may be conveniently used by the user for storing small items of foodstuff which would otherwise pass through the wire openings of the shopping cart basket or be placed in the pockets of the shopper. It may also be used to hold a beverage cup, small change, infant articles, as it is located next to the infant seat, etc.

It is within the ambit of the present invention to cover any obvious modifications of the examples of the preferred embodiment described herein, provided such modifications fall within the scope of the appended claims.

I claim:

1. An arresting bracket in combination with a shopping cart lock mounted on a handlebar of a shopping cart, said arresting bracket being formed from a wire rod and having a lock arresting portion to prevent said lock from tilting forwardly on said handlebar toward a rear gate portion of said cart, a bridge portion extending from said lock arresting portion and terminating in an attachment loop at an end of said wire rod, said loop being secured about one or more top horizontal wires of said rear gate forwardly of said handlebar.

2. A lock arresting bracket as claimed in claim 1 wherein said arresting bracket is formed from a wire rod bent in a U-shape, opposed free ends of said rod having a loop portion formed therein and constituting said attachment, said U-shape having opposed substantially parallel straight side wire portions merging into a transverse straight wire portion, said side wire portions constituting said bridge portion and having said loops formed at their free ends, said transverse straight wire portion constituting said lock arresting portion.

3. A lock arresting bracket as claimed in claim 2 wherein said arresting portion is engaged with a rear wall of said lock.

4. A lock arresting bracket as claimed in claim 2 wherein said wire rod is further shaped to define a handlebar receiving channel in a portion of each said side wire portions adjacent opposed ends of said straight wire portion.

5. A lock arresting bracket as claimed in claim 4 wherein said handlebar receiving channel at said opposed ends of said straight wire portion extends transversely to said straight wire portion on a common side thereof.

6. A lock arresting bracket as claimed in claim 4 wherein said handlebar or said shopping cart extends through said handlebar receiving channels of said bracket with said lock disposed between said channels, said straight wire portion extending across said rear wall of said lock, said loop at said opposed free ends of said side wire portions being secured about a top portion of said rear gate of said shopping cart.

* * * * *